United States Patent
Blomquist et al.

(10) Patent No.: US 6,193,945 B1
(45) Date of Patent: Feb. 27, 2001

(54) METHOD OF RECOVERING CALCIUM FROM WASTE MATERIAL OR CONTAMINATED NATURAL CALCIC MATERIAL

(76) Inventors: Markus Blomquist, Tomtegata 5C, N-2004, Lillestrom (NO); Gunter Betz, Schurbergstrasse 17, CH-4805, Brittnau (CH)

(*) Notice: Subject to any disclaimer, the term of this patent is extended or adjusted under 35 U.S.C. 154(b) by 0 days.

(21) Appl. No.: 09/147,941

(22) PCT Filed: Sep. 24, 1997

(86) PCT No.: PCT/FI97/00572

§ 371 Date: Apr. 13, 1999

§ 102(e) Date: Apr. 13, 1999

(87) PCT Pub. No.: WO98/13298

PCT Pub. Date: Apr. 2, 1998

(30) Foreign Application Priority Data

Sep. 27, 1996 (FI) .......................................... 963854

(51) Int. Cl.[7] ............... C01F 1/00; C01F 11/00; C01F 11/18
(52) U.S. Cl. ............ 423/430; 423/419.1; 423/165; 423/163; 423/162; 423/158; 423/155; 162/189
(58) Field of Search ................... 423/155, 158, 423/162, 163, 165, 430, 419.1; 162/189

(56) References Cited

U.S. PATENT DOCUMENTS

| | | |
|---|---|---|
| 5,164,172 | 11/1992 | Katayama et al. . |
| 5,290,353 | 3/1994 | Goffin et al. . |
| 5,376,343 | * 12/1994 | Fouche .................. 423/165 |
| 5,846,500 | * 12/1998 | Bunger et al. .......... 423/155 |
| 5,919,424 | * 7/1999 | Klyosov et al. ........ 423/165 |
| 5,961,941 | * 10/1999 | Klyosov et al. ........ 423/165 |
| 5,997,833 | * 12/1999 | Bunger et al. .......... 423/309 |

FOREIGN PATENT DOCUMENTS

| | | |
|---|---|---|
| 2142663 | 8/1995 | (CA) . |
| 1134974 | 8/1962 | (DE) . |
| 0406662 | 1/1991 | (EP) . |
| 0499666 | 8/1992 | (EP) . |
| 540540 | 9/1994 | (EP) . |
| 0673879 | 9/1995 | (EP) . |
| 300813 | 5/1968 | (SE) . |

* cited by examiner

Primary Examiner—Steven P. Griffin
Assistant Examiner—Eileen E. Nave
(74) Attorney, Agent, or Firm—Nixon & Vanderhye P.C.

(57) ABSTRACT

Method of recovering calcium carbonate from waste material or contained natural calcic material. Calcium is recovered by prepariag an aqueous suspension the material containing calcium to be recovered and by lowering the pH of the suspension to pH<6, preferably pH<4, for providing a spension including an acidic liquid phase containing the calcium compounds in soluble form. Thereafter the pH of the liquid is raised to pH>6, preferably pH>7, by mixing a base therein, for precipitating the main portion of aluminium therein. Thereafter the neutral or basic liquid phase is carbonized by introducing $Na_2CO_3$ or $NaHCO_3$ therein, for precipitation of the calcium compounds as $CaCO_3$.

17 Claims, 1 Drawing Sheet

METHOD OF RECOVERING CALCIUM FROM WASTE MATERIAL OR CONTAMINATED NATURAL CALCIC MATERIAL

The present invention refers to a method of recovering calcium from waste material or contaminated natural calcic material. The present invention also refers to the use of calcium recovered by such method.

High grade calcium carbonate is used in a variety of products, e.g. as filler or pigment in paper, paint, polymers, tooth paste etc. Virgin or natural calcic material is used for the production of fillers and pigments. A plurality of new calcium mines or quarries have to be opened in order to fulfil the need, these new quarries causing undesired changes in the landscape and environment. In spite of new opened quarries calcium carbonate often has to be transported over long distances, which increases the costs of filler and pigment.

At the same time growing depots are need to store residues, rejects, refuse and different kinds of waste material, which contains calcium. These depots, besides probably causing pollution, also cause undesired changes in the landscape and environment.

The object of the present invention thereby is to provide a recycling method, according to which $CaCO_3$ may be recovered from all types of residues, such as from rejects and refuse from various production processes and even from municipal waste, which contain calcium.

A further object of the present invention is to provide a method for recovering of calcium from such heavily contaminated natural calcic materials in old mines and quarries, from which it has not until now been economically feasible to recover calcium for use as pigment in paper production.

It is also an object of the present invention to provide a method for recovering calcium from residues, rejects, refuses and waste material, in order to substantially reduce the volumes of waste and the costs for handling of them. This is a very important object of the present invention when considering the continuously decreasing space for waste disposal and the need to decrease pollution.

It is a still further object of the present invention to provide a method for recycling high-grade calcium carbonate in order to thereby substantially decrease the need to open up new mines or quarries for extracting natural calcium carbonate.

The present invention for recovering calcium from waste material or contaminated natural calcic material is characterized by what is stated in the appending claims. Thereby calcium may according to a preferred embodiment of the present invention be recovered from waste or contaminated natural calcic material by a method including following consecutive steps:

(a) providing waste material or contaminated natural calcic material in which the calcium compounds are mainly in an acid soluble form, such as CaO and $CaCO_3$;

(b) preparing an aqueous suspension of said material in step (a);

(c) lowering the pH of said aqueous suspension in step (b) to pH<6, preferably pH<4, by mixing an acid such as HCl or $HNO_3$ therein, for providing a suspension including an acidic liquid phase containing said calcium compounds and other compounds, such as aluminium, silicate and/or magnesium compounds, present in acid soluble form;

(d) raising the pH of said acidic liquid phase in step (c) to pH>6, preferably pH>7, by mixing a base, such as NaOH therein, for precipitating the main portion of aluminium compounds present in said liquid phase and thereby providing
a solid phase, including the precipitated aluminium compounds and other non-soluble impurities, and
a neutral or basic liquid phase, including the main portion of said calcium compounds in soluble form;

(e) separating said solid phase from said neutral or basic liquid phase in step (d);

(f) carbonizing said neutral or basic liquid phase in step (e), e.g. by introducing $Na_2CO_3$ or $NaHCO_3$ therein, for precipitating said calcium compounds as $CaCO_3$, and (g) separating the precipitated $CaCO_3$ in step (f) from said neutral or basic liquid phase.

In step (c) pH of the aqueous phase should in most cases preferably be lowered to pH<4 or even less, such as pH<3, for a maximal dissolution of compounds.

Should the waste material, from which calcium compounds are to be recovered, be in a non-soluble form, then a pre-treatment step is needed, in which the waste material is burned to provide an ash which contains calcium compounds in an acid soluble form, such as CaO or $CaCO_3$. The waste material may e.g. be a composite material including calcium compounds mixed with polymer, the polymer preventing calcium compounds from being mixed with acid and dissolved. By burning the polymer material a residue including readily soluble calcium oxide or calcium carbonate is achieved. All kinds of industrial reject material or recycled waste material, such as waste paper, or municipal refuse in liquid or solid form, may first be burnt to provide calcium oxide or calcium carbonate in an easily soluble form.

It is in most cases recommended that non-soluble compounds are separated from the suspension after step (c) before raising the pH level to pH>6. Most waste materials include non-soluble compounds which are not soluble in acidic liquid. These compounds should preferably be separated from the acidic liquid and be further treated in separate recovery processes or be deponed for possible later use not disclosed here.

In step (d) different acid soluble compounds may be precipitated in one single step or in a plurality of separate precipitation steps, depending on which compounds are to be recovered separately and which may be separated as mixed material. E.g. in precipitating step (d) pH of the liquid phase may be raised in one single step (by the addition of e.g. NaOH) to a suitable pH level at which e.g. aluminium, silicates and magnesium compounds are precipitated together. In many applications, however, it may be desirable to perform the precipitation in two or even more separate steps, thereby e.g. raising pH in a first pH raising step to a pH level between pH 5–pH 9. and in a second pH raising step to a pH level between pH 10–pH 12. Precipitated solid compounds are separated from the suspension after each pH raising step. Typically aluminium compounds precipitate at a pH range between pH 5–pH 9. In the second precipitating step in a pH range between pH 10–pH 12 solid compounds, such as magnesium compounds may be separated from the liquid phase.

In order to separate calcium, which e.g. is present as $CaCl_2$ and/or $Ca(OH)_2$, the neutral or basic liquid phase, from which precipitated solid particles have been separated, may in step (f) be carbonized by introducing $Na_2CO_3$ or $NaHCO_3$ therein. The calcium carbonate precipitates and may be separated as a very clean product.

In order to enhance the precipitation of impurities and other solid material from liquid phase in step (c) or step (d)

a coagulant, such as an aluminium based coagulant, may be introduced into the liquid phase. Aluminium, present in the waste material and/or added as coagulant, precipitates typically in gel like form, which tends to improve the separation of other solid material, such as heavy metals, from the liquid phase. A flocculant may be introduced into the basic liquid phase for enhancing separation of solid compounds there from.

Different ways of separating precipitated solid material from the liquid suspension are available, such as sedimentation, filtration, flotation or centrifugal separation.

The present invention provides a very efficient method for recovering calcium compounds from a most different residues or waste materials, for re-use, e.g. as filler, coating material or pigment in a variety of products, such as in paper.

Also natural heavily contaminated calcic material can be easily cleaned for normal use.

The present invention thereby provides a method which decreases the need to open up new calcium mines or quarries, which tend to destroy landscape and environment. Calcium can be recovered close to the cite where it is to be used, which decreases need for transportation. Also the present invention has an impact on waste material deponed, which do not have to grow as fast as today if the amount and volume of waste material is decreased. The recycling of calcium according to the present invention does not have a negative impact on the quality of calcium itself, as has e.g. paper recycling on pulp fibers. All calcium carbonate recovered according to the present invention may be used, only impurities are disposed of, loss of calcium is very small.

The present invention will be described more closely with reference to following drawings, in which FIG. 1 shows schematically process steps according to the present invention for recovering calcium carbonate from an ash material;

Figure 1:
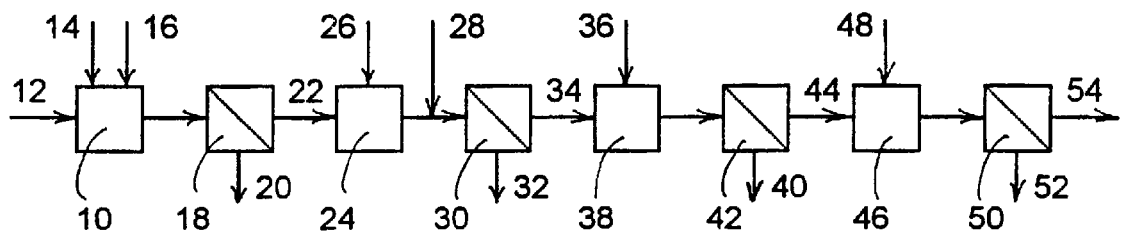

FIG. 1 shows schematically a plurality of process steps for recovering calcium carbonate from ash. Typically ash from combustion of waste material, such as a residue or reject from a manufacturing process, municipal waste material or solid material separated from waste water, may be used. In a first step 10 ash 12 is mixed with water 14 to provide a suspension. Acid 16, such as HCl or $HNO_3$, is mixed with the suspension to lower the pH of the suspension to a level below pH 6, preferably below pH 4. No addition of acid is needed if the pH of the suspension already is at a suitable level for dissolving calcium oxide or calcium carbonate therein.

In a following step 18 solid material 20, which is not soluble in the acid suspension is separated, e.g. by flotation, sedimentation, centrifugation, filtration, from the liquid phase 22.

The liquid phase 22 is mixed in following step 24 with NaOH or any other suitable base 26 for increasing the pH of the liquid to a level preferably over pH 6, e.g. to about pH 7, for precipitating aluminium compounds therein. A gel like solid material, including aluminium compounds, is formed. A flocculant 28, such as polyacrylamide (PAM), may be mixed into the liquid in order to enhance separation of the solid material from the liquid phase, the flocculant improving the dewatering conditions of the solid material. In a subsequent separation step 30 solid material 32, including besides aluminium compounds other solidified compounds such as silicates, are separated from the liquid phase 34.

Further NaOH, or some other suitable base 36 is mixed with the liquid phase 34 in step 38, for increasing pH of the liquid to a level about pH 12, for precipitation of magnesium compounds. Precipitated magnesium compounds 40 are separated in a subsequent separation step 42.

In following step 46 the liquid phase 44 from step 42 is carbonized by mixing $Na_2CO_3$ 48 or $NaHCO_3$ therein, whereby $CaCO_3$ is formed. In the following separation step 50 a clean solid calcium carbonate 52 is separated from a clear liquid phase 54.

The size of the precipitated calcium carbonate particles may be controlled by controlling the pH before carbonization. Also temperature and concentration of calcium carbonate have an impact on the size of particles provided.

Figure 2:
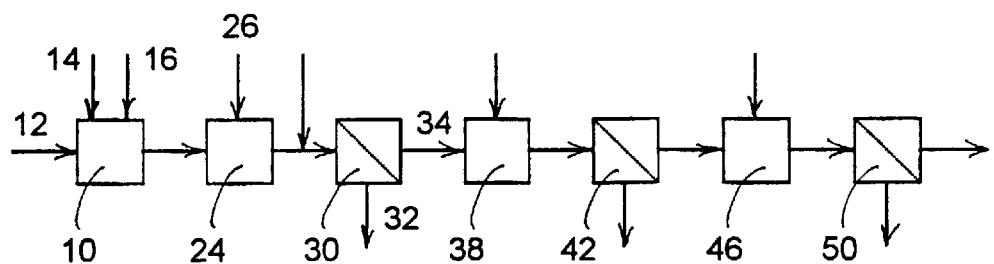
FIG. 2 shows schematically slightly different process steps according to the present invention for recovering calcium carbonate from an ash material.

The process steps shown in FIG. 1 can in certain applications be simplified, as is shown in FIG. 2. Same reference numerals are used in FIG. 2 as in FIG. 1. Similarly as in the process shown in FIG. 1 ash 12 is mixed in a first step 10 with water 14 to provide a suspension. Acid 16 is mixed with the suspension to lower the pH of the suspension to a level preferably below pH 4, in order to dissolve acid soluble compounds. In this simplified process the pH of the suspension is immediately thereafter increased in step 24, without first separating solid compounds there from, by introducing NaOH or another base 26 therein to a level above pH 6, in order to precipitate aluminium compounds. Only thereafter is solid material 32 separated from the liquid phase 34 in a subsequent separation step 30. In this step solid material, such as heavy metals, which were not dissolved in the acid suspension, as well as, newly precipitated aluminium compounds and silicates are separated from the liquid phase. Following steps are the same as described in FIG. 1.

Figure 3:
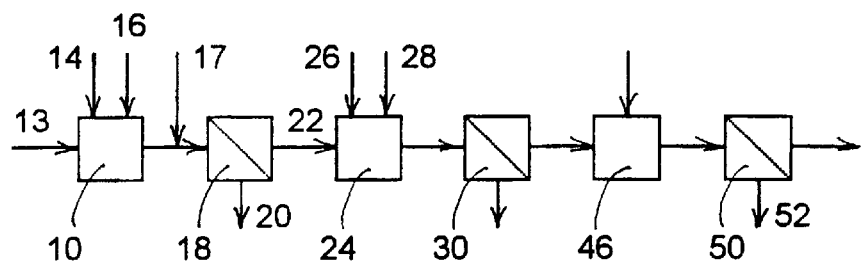
FIG. 3 shows schematically process steps according to the present invention for cleaning impure calcium carbonate.

In FIG. 3 is shown process steps for cleaning or optically upgrading impure calcium carbonate, e.g. impure natural calcic material or precipitated calcium carbonate, i.e. calcium carbonate which is optically not clean enough to be used as filler. Same reference numerals are used as in FIG. 1 and 2 where applicable.

The impure calcium carbonate 13, as solid material or as a suspension, is mixed with water 14 to provide a suspension. Acid 16, such as HCl or $HNO_3$, is mixed into the suspension for dissolving calcium carbonate. A coagulant 17, preferably an aluminium compound, is mixed into the suspension, in order to enhance separation at a later stage. Non-soluble components 20 may be separated at this stage in any suitable manner from the liquid phase 22, which includes calcium compounds and coagulant in soluble form. A base 26, such as NaOH, is mixed with the liquid phase 22 for precipitation of aluminium compounds and possible other non-desired pigments. Aluminium precipitates in a gel like form, which enhances the separation of other impurities from the liquid phase. A flocculant 28 may be mixed into the suspension before separation of aluminium compounds in order to enhance separation.

Calcium carbonate 52 is separated from the liquid phase in following steps 46 and 50 as described in relation to FIG. 1.

Figure 4:
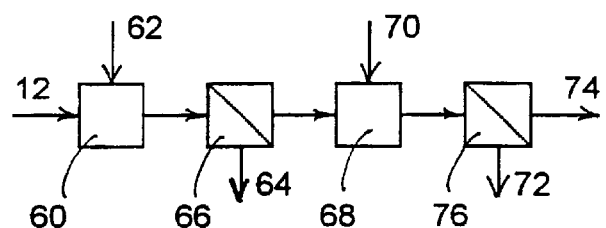
FIG. 4 shows schematically a pre-treatment process for separating aluminium from ash before acid treatment according to the present invention.

FIG. 4 shows schematically pretreatment steps for separating aluminium from ash before acid treatment of ash. If the waste material, from which calcium carbonate is to be recovered includes large amounts of aluminium, it may be economical to first separate at least a portion of the aluminium there from.

FIG. 4 shows introduction of ash 12 into a pre-treatment step 60 in which ash is mixed with liquid $Na_2CO_3$ or $NaHCO_3$ 62, for dissolving aluminium as natrium aluminate. Calcium compounds 64 are not dissolved, but separated as a solid phase in a subsequent separation step 66. The calcium compounds may then be introduced into a cleaning stage 10 as shown in FIG. 1. In a subsequent step 68 in the pre-treatment process is $CO_2$ gas 70 introduced into the liquid phase, for precipitating aluminium hydroxide 72 in solid form from $NaHCO_3$ 74 in liquid form.

Aluminium hydroxide is separated from $NaHCO_3$ in separation step 76. The $NaHCO_3$ can be recycled to step 60 in the beginning of the process. This pre-treatment process thereby can re-use the $NaHCO_3$ needed for separation of aluminium.

Following examples were made to show recovery of calcium carbonate from waste material from a de-inking plant.

EXAMPLE I 5 g of an ash including

|    | in %  | as oxide |
|----|-------|----------|
| Ca | 31.58 | 44.18    |
| Si | 12.40 | 26.53    |
| Al | 9.81  | 18.53    |
| Mg | 3.34  | 5.53     | was mixed into 300 ml 1 M HCl to dissolve Ca, Si, Al and Mg compounds therein and provide a suspension with pH 2,5. Non-soluble silicate components were filtered from the suspension to provide a clear liquid phase. pH of the liquid phase was raised by introduction of NaOH to pH 5,5 for precipitation of aluminium compounds, which were separated by filtration. Additional NaOH was introduced into the liquid phase to pH 12, magnesium compounds were precipitated and separated. 40 ml 1M $Na_2CO_3$ was mixed into the remaining liquid phase for precipitation of calcium compounds.

Following solid components were separated in the separation processes:

| non-soluble silicates | 1 g |
| aluminium compounds | 2.2 g |
| magnesium compounds | 0.2 g |
| clean calcium carbonate | 2.5 g |
| Calcium yield was 63%. | |

EXAMPLE II 5 g of an ash including

|    | in %  | as oxide |
|----|-------|----------|
| Ca | 31.58 | 44.18    |
| Si | 12.40 | 26.53    |
| Al | 9.81  | 18.53    |
| Mg | 3.34  | 5.53     | was mixed into 450 ml 1 M HCl to dissolve Ca, Si, Al and Mg compounds therein and provide a suspension with pH 1. Non-soluble silicate components were filtered from the suspension to provide a clear liquid phase. pH of the liquid phase was raised by introduction of NaOH to pH 5,5 for precipitation of aluminium compounds, which were separated by filtration. Additional NaOH was introduced into the liquid phase to pH 12, magnesium compounds were precipitated and separated. 40 ml 1M $Na_2CO_3$ was mixed into the remaining liquid phase for precipitation of calcium compounds.

Following solid components were separated:

non-soluble silicates 1 g aluminium compounds 2,3 g magnesium compounds 0,3 g clean calcium carbonate 2,8 g Calcium yield was 71%.

Similar tests show that clean useful calcium carbonate can be separated from ash from combustion of municipal waste and from slag. 0, 3 g clean calcium carbonate was recovered from 5 g ash (municipal waste). 0.9 g calcium carbonate was recovered from 10 g slag.

What is claimed is:

1. A method of recovering calcium compounds from waste material comprising the steps of:

(a) providing waste material containing calcium compounds in an acid soluble form from at least one waste material source selected from the group consisting of (i) industrial reject material, (ii) recycled waste material, and (iii) pigment-discolored natural calcic material;

(b) preparing an aqueous suspension of said waste material provided in step (a);

(c) lowering the pH of said aqueous suspension prepared in step (b) to a pH less than 6 by mixing an acid therein to provide a suspension including an acidic liquid phase containing said calcium compounds and other acid-soluble non-calcium compounds;

(d) raising the pH of said acidic liquid phase obtained in step (c) to a pH greater than 6 by mixing a base therein to precipitate a major portion of the non-calcium compounds present in said liquid phase and thereby provide, (1) a solid phase, including the precipitated non-calcium compounds and other non-soluble impurities, and (2) a neutral or basic liquid phase, including a major portion of said calcium compounds in soluble form;

(e) separating said solid phase from said neutral or basic liquid phase obtained in step (d);

(f) carbonizing said neutral or basic liquid phase separated in step (e) to precipitate said calcium compounds as $CaCO_3$; and (g) separating the $CaCO_3$ precipitated in step (f) from said neutral or basic liquid phase.

2. A method according to claim 1, which further comprises a pre-treatment step which includes burning waste material including calcium compounds at least partly in a non-soluble form to provide an ash containing calcium compounds in an acid soluble form.

3. A method according to claim 1, wherein between step (c) and step (d) there is practiced the step of separating non-acid-soluble compounds from the suspension.

4. A method according to claim 1, wherein step (d) includes raising the pH of said liquid phase in two steps by raising the pH of said liquid phase in a first pH raising step to between pH 6–pH 9, and thereafter raising the pH of said liquid phase in a second pH raising step to between pH 10–pH 12, and separating first solid compounds from said liquid phase after the first pH raising step and separating second solid compounds from said liquid phase after the second pH raising step.

5. A method according to claim 4, wherein the first solid compounds include aluminum compounds, and wherein the second solid compounds include magnesium compounds.

6. A method according to claim 1, which comprises introducing into said liquid phase a coagulate to enhance precipitation of impurities in step (d).

7. A method according to claim 6, wherein the coagulant is an aluminum based coagulant.

8. A method according to claim 1, wherein aluminum is present in aqueous suspension of waste material provided by step (b), and wherein step (d) includes precipitating aluminum in a gel-like form and wherein step (e) includes separating said gel-like precipitate of aluminum.

9. A method according to claim 1, which further comprises the step of separating non-dissolved solid material by at least one separation technique selected from the group conisting of sedimentation, filtration, floatation and centrifugal separation.

10. A method according to claim 1, wherein the recycled waste material is at least one solid or liquid waste material selected from the group consisting of waste paper, municipal refuse, and recycled composite compounds.

11. A method according to claim 1, wherein the calcium compounds in an acid soluble form include at least one selected from the group consisting of CaO and $CaCO_3$.

12. A method according to claim 1, wherein the calcic material is discolored by heavy metal pigments.

13. A method according to claim 1, wherein the pH is lowered in step (c) to less than pH 4.

14. A method according to claim 1, wherein the acid mixed With the aqueous suspension in stop (c) is HCL or $HNO_3$.

15. A method according to claim 1, wherein said other acid-soluble non-calcium compounds include at least one selected from the group consisting of aluminum, silicate and magnesium compounds.

16. A method according to claim 1, wherein step (f) is practiced by introducing $Na_2CO_3$ or $NaHCO_3$ into the neutral or basic liquid phase.

17. A method according to claim 1, which comprises introducing into said liquid phase a flocculant to enhance separation of solid compounds.

* * * * *